United States Patent [19]

Gilley

[11] 3,714,821
[45] Feb. 6, 1973

[54] MATERIAL FATIGUE TESTING SYSTEM

[75] Inventor: Paul J. Gilley, Decatur, Ala.

[73] Assignee: The United States of America as represented by the Administrator of the National Aeronautics Space Administration

[22] Filed: Dec. 1, 1970

[21] Appl. No.: 94,049

[52] U.S. Cl..........................................73/90, 73/91
[51] Int. Cl................................................G01n 3/32
[58] Field of Search......................................73/90–93

[56] References Cited

UNITED STATES PATENTS

| | | | |
|---|---|---|---|
| 3,589,175 | 6/1971 | Bock | 73/91 |
| 3,535,921 | 10/1970 | Smiley | 73/91 |
| 3,304,768 | 2/1967 | Naumann et al. | 73/90 |
| R26,782 | 2/1970 | Preston | 73/90 |
| 3,095,733 | 7/1963 | Sjöström | 73/91 |
| 3,583,214 | 6/1971 | Kreiskorte | 73/90 |
| 3,187,565 | 6/1965 | Kreiskorte et al. | 73/67.3 |

*Primary Examiner*—Jerry W. Myracle
*Attorney*—L. D. Wofford, Jr., G. J. Porter and John R. Manning

[57] ABSTRACT

A system for cyclicly applying a varying load to a material under test. It includes a load sensor which senses the magnitude of load being applied to a material, and, upon sensing a selected magnitude of loading, causes the load to be maintained for a predetermined time and then causes the system to resume cyclical loading.

1 Claim, 2 Drawing Figures

PATENTED FEB 6 1973

3,714,821

Paul J. Gilley,
INVENTOR

BY
George J. Porter
ATTORNEY.

MATERIAL FATIGUE TESTING SYSTEM

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION AND DESCRIPTION OF THE PRIOR ART

This invention relates to devices and systems for testing the strength of materials and particularly to a device for applying tensile and compressive loads to a test specimen.

Heretofore, test devices have been used for elongating and compressing test samples of materials and at least one such device includes means for applying a cyclic load, in that it applies a continuously varying load between two preselected values. In this manner a fatigue characteristic is determined for the sample which when compared with the requirements for use of a material provides valuable, and in many instances critical, information. It has been determined, however, that continuous cyclic loading does not in some instances sufficiently simulate conditions to which the material will be ultimately subjected to provide reliable fatigue data.

SUMMARY OF THE INVENTION

The present invention encompasses a system for applying a varying or changing load to a test sample in which there is included a sensor which senses a varying load being applied to a test sample as loading is effected and upon sensing a predetermined length of elongation or compression, interrupts the change in loading and holds the predetermined level for a selected period of time after which cyclic variation in loading is resumed. Thus, in accordance with the invention, a load testing system is provided which will subject a sample to cyclic loading wherein each cycle includes a period in which loading is continuously varied and a period in which loading is fixed.

DESCRIPTION OF THE PREFERRED EMBODIMENT

Figure 1:
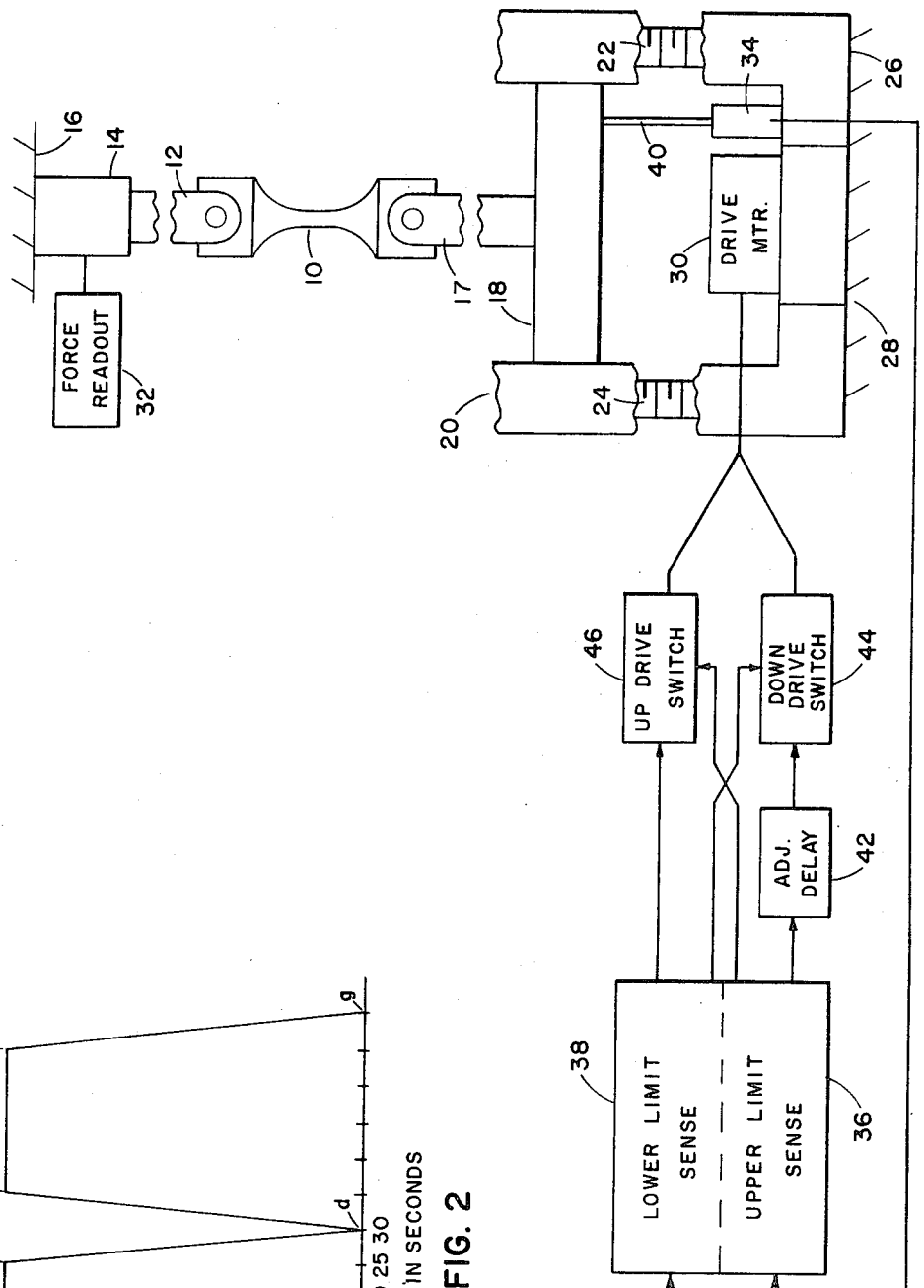
FIG. 1 is a schematic illustration, mechanical and electrical, of the testing system of the character described.

Referring initially to FIG. 1, a sample 10 of material to be tested is supported at the top by mounting bracket 12 which is suspended from load cell 14 which in turn is attached to fixed support 16. The bottom end of sample 10 is coupled to mounting bracket 17 which attaches to arm 18 of movable crosshead 20. Movable crosshead 20, which functions to apply a load to sample 10 with respect to fixed support 16, includes two large vertical screws 22 and 24 which are powered by reduction gear box 26 mounted within base 28. Reversible electrical drive 30 provides a reversible drive to gear box 26. Thus with rotational input 21 in one direction crosshead 20 would be caused to move downward to apply tension to sample 10, and with rotational input 23 in the opposite direction crosshead 20 would be caused to move upward to apply a compressive load to sample 10.

Load cell 14 provides an electrical output proportional to the applied load, whether it be compression or tension and the output is indicated by force readout 32. Force readout 32 may be any type of conventional indicator, either of the instantaneous reading type or of the recording type.

The position of crosshead 20 with respect to base 28 is electrically sensed by position sensor 34 and it provides an electrical output to upper and lower limit sense detectors 36 and 38. Position sensor 34 is conventional and typically would consist of a potentiometer (not shown) wherein the movable arm would be moved by a position sensing arm 40 and electrical output would be taken from the movable arm which would provide a voltage output proportional to the position of the movable arm and thus the position of crosshead 20.

Upper and lower limit sense detectors 36 and 38 are conventional and typically each would consist of an adjustable voltage comparator wherein if the voltage input 35 to upper limit sense detector 36 came up to a preset value, upper limit sense detector 36 would be operated to provide electrical output and in the event the input 35 to lower limit sense detector 38 fell to a predetermined value the latter would provide an electrical output. One such output 37 from upper limit sense detector 36 is coupled to adjustable delay unit 42, which in turn operates down-drive switch 44 to cause motor drive 30 to drive crosshead 20 downward. A second connection from output 37 from upper limit sense detector 36 is applied to updrive switch 46 and has the effect of causing updrive switch 46 to de-energize motor drive 30 when it is operating crosshead 20 upward. One output 39 of lower limit sense detector 38 is supplied down-drive switch 44 to cause motor drive 30 to produce a halt in downward movement of crosshead 20 and a second connection from output of lower limit sense detector 38 is applied to up-drive switch 46 to cause motor drive 30 to commence driving movable crosshead 20 upward.

Adjustable delay unit 42 is a conventional timing switch having appropriate contacts to be energized upon receiving an output from upper limit sense detector 36 and, following the elapse of a preset time, to apply a delayed an output 37 to down-drive switch 44 which in turn causes motor drive unit 30 to drive movable crosshead 20 in a downward direction. Thus movable crosshead 20 will be driven downward after it has first reached an upper preset position limit detected by upper limit sense detector 36, and after a predetermined period of loading has been maintained, which period is manually set into adjustable delay 42. The output 39 of lower limit detector 38, which is applied as an input to down-drive switch 44, serves as a cutoff or "stop" signal to down-drive switch 44 when movable crosshead 20 has reached a sensed lower limit. Similarly, the output 37 of upper limit sense detector 36 which is applied as an input to up-drive switch 46 supplies a "stop" signal to up-drive switch 46 when movable crosshead 20 has reached a sensed upper position limit.

Figure 2:
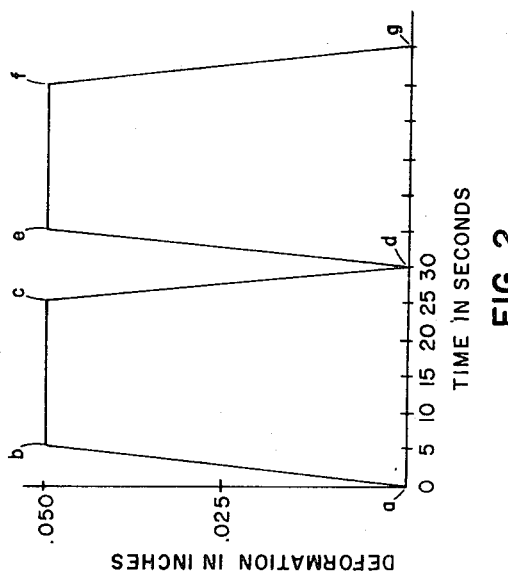
FIG. 2 is a curve illustrating operation of the invention.

To consider operation of the system, assume first that it is desired to supply a compressional load to sample 10 which will produce the curve shown in FIG. 2, which is a plot of deformation of sample 10 versus time. Assume further that initially that lower limit sense detector 38 is set to some selected value, e.g., 0.050 inches. Thus, at the outset or zero time (point $a$ in FIG. 2) the deformation is at zero, the lower limit, and lower limit sense detector 38 is operated to provide a "switch on" or "operate" signal 39 to up-drive switch 46 which in turn causes motor drive 30 to operate, and, through gearbox 26, to commence driving movable crosshead 20 upward. At the same time the output 29 of lower limit sense detector 38 would have provided a turn off signal to downdrive switch 44 to insure that the downdrive input 21 of the motor drive 30 is cut off.

Movable crosshead 20 would continue to move upward until an output 35 from position sensor 34 reached a value representative of the upper preset limit, or 0.050 inches in this case (point $b$ in FIG. 2) which would cause upper limit detector 36 to be operated. Upper limit sense detector 36 will then provide a "turn off" signal 37 to up-drive switch 46 which would de-energize motor drive 30 and provide an "operate" signal 37 to adjustable delay 42. Adjustable delay 42 will then start timing a preset period and at the end of this period (point $c$ in FIG. 2) will apply a delayed switching signal 37 to down-drive switch 44 which will cause motor drive 30 to be energized and commence driving movable crosshead 20 downward. When movable crosshead 20 returns to its original lower position, as sensed by position sensor 34, lower limit detector 38 will be operated and it in turn will apply an "off" switching signal 39 to down-drive switch 44 and an "on" switching signal 39 to up-drive switch 46. The result will be that movable crosshead 20 reverses direction from a downward movement to an upward movement (point $d$ in FIG. 2). Upward movement will continue until upper limit sense detector 36 senses that movable crosshead 20 has again reached the selected maximum value (point $e$ in FIG. 2) at which time upper limit sense detector 36 again applies an "off" switching signal 37 to up-drive switch 46 and an "operate" switching signal 37 to adjustable delay 42 and the delay period is repeated. At the end of the delay period (point $f$ in FIG. 2) down-drive switch 44 is again operated and movable crosshead 20 moves downward until lower limit sense detector 38 senses that it has reached the bottom of its preset travel (point $g$ in FIG. 2). Thus there has been traced two cycles of operation, which, as shown in FIG. 2, causes sample 10 to be subjected, in succession, to a period of increasing compression, of constant compression, and a period of decreasing compression.

While as illustrated and thus far described, the loading applied to sample 10 has been compressional, the system of this invention is capable of effecting variable and fixed periods of tension on the sample. To effect this change, it is only necessary to connect adjustable delay circuit 42 in circuit with lower limit sense detector 38 and up-drive switch 46 rather than downdrive switch 44, as shown. Actually, an adjustable delay 42 may be included in both drive switching circuits and a delay achieved at both upper and lower preselected limits, making possible both compressional and tensile tests with periods of both varying and maintained compression and/or tension.

It is to be further noted that although as shown, the control limits are based upon dimensional limits which are detected by position sensor 34, if desired, the limits may be selected in terms of loading and upper and lower limit sense detectors 36 and 38 controlled by loading signals supplied by load cell 14.

What is claimed is:

1. A testing system for applying load to an oblong test sample of material having one end attached to a fixed support, comprising:
   electro-mechanical load application means attached to the opposite end of said test sample, said means being responsive to a first input for applying a force to said sample which tends to elongate it and responsive to a second input for applying a force to said sample which tends to compress it, said load application means comprising a moveable crosshead;
   position-sensing means attached to said electro-mechanical load application means comprising;
   1. a position sensing arm attached to said crosshead;
   2. a potentiometer attached to said position sensing arm, said potentiometer being responsive to movement of said crosshead for providing an electrical output which is a function of the magnitude of a dimension of said sample of material;
   upper limit sense detection means responsive to said electrical output from said sensing means for detecting a selected maximum output from said sensing means and providing in response thereto a first switching signal;
   lower limit sense detection means responsive to said electrical output from said sensing means for detecting a selected lower value of output from said sensing means and providing in response thereto a second switching signal;
   first switching means responsive to a said first switching signal for providing said first input to said electro-mechanical load application means and responsive to said second switching signal for turning off said first input;
   second switching means responsive to said second switching signal for providing said second input to said electro-mechanical load application means and responsive to said first switching signal for turning off said second input; and
   adjustable delay means in circuit between said upper limit sense detection means and said first switching means for delaying the application of said first switching signal to said first switching means for a predetermined period.

* * * * *